Feb. 6, 1934.    W. A. CHRYST    1,945,596
AUTOMATIC LUBRICATING SYSTEM
Filed Feb. 19, 1931    2 Sheets-Sheet 1

Inventor
WILLIAM A. CHRYST,

Patented Feb. 6, 1934

1,945,596

UNITED STATES PATENT OFFICE 1,945,596

AUTOMATIC LUBRICATING SYSTEM

William A. Chryst, Dayton, Ohio, assignor to Delco Products Corporation, Dayton, Ohio, a corporation of Delaware Application February 19, 1931. Serial No. 516,881

3 Claims. (Cl. 184—7)

This invention relates to a system of lubrication for the chassis of motor driven vehicles.

It is among the objects of the present invention to provide a lubricating system for the chassis of a motor driven vehicle which will deliver lubricant under pressure from a suitable source of supply to the various bearings in the chassis during predetermined measured distances of vehicle operation.

Further objects and advantages of the present invention will be apparent from the following description, reference being had to the accompanying drawings wherein a preferred embodiment of one form of the present invention is clearly shown.

Figure 1:
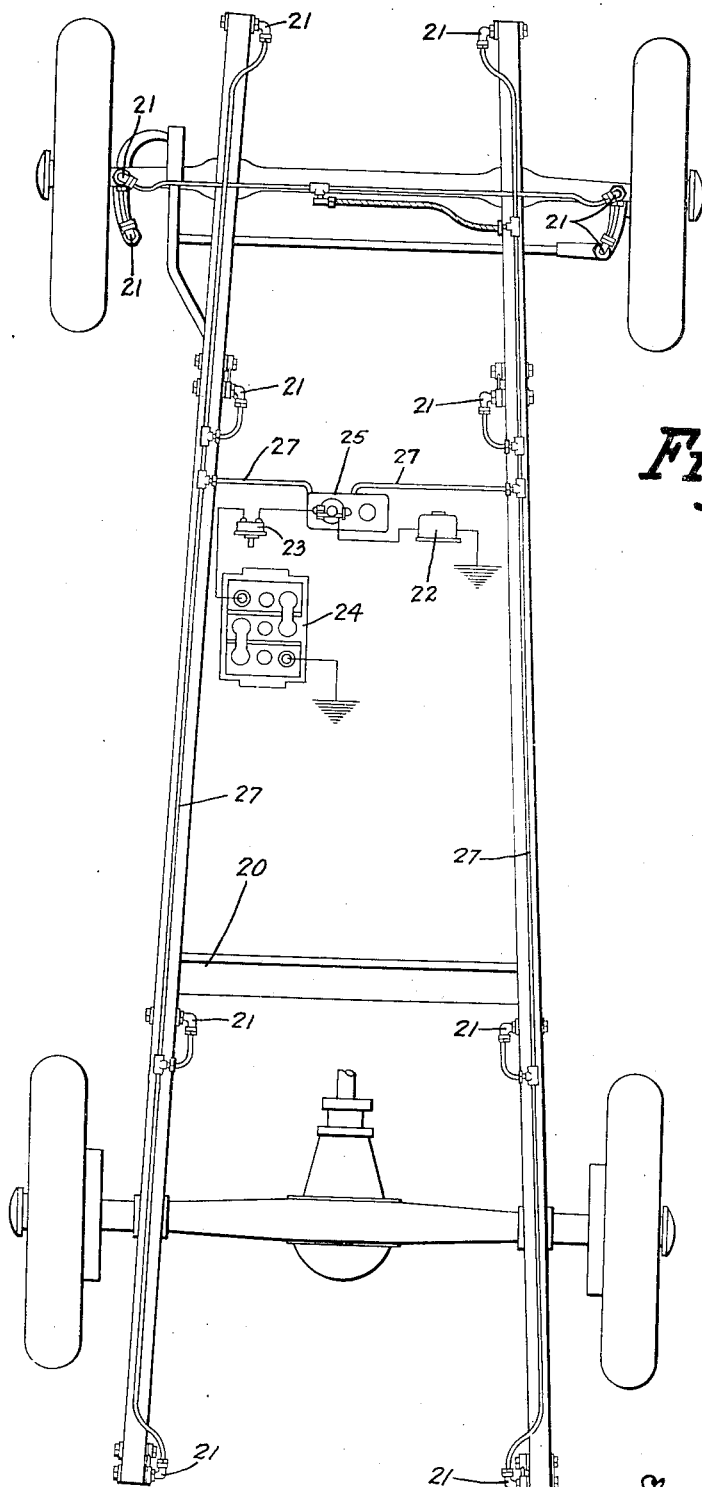
Fig. 1 is a plan view of the vehicle chassis showing the various bearings and the lubricant distributing pipes connected thereto.

Referring to the drawings the numeral 20 designates as a whole the chassis of a vehicle. The various lubricator couplings are designated by the numeral 21 these couplings being connected to the various bearings used in the chassis of the vehicle. The numeral 22 designates the speedometer in which an odometer is provided this mechanism being operated when the vehicle is in operation. The numeral 23 designates the ignition switch operable to render the ignition effective for running of the engine. The internal combustion engine has been omitted from the chassis view. The source of electrical energy or storage battery is designated by the numeral 24.

Figure 2:
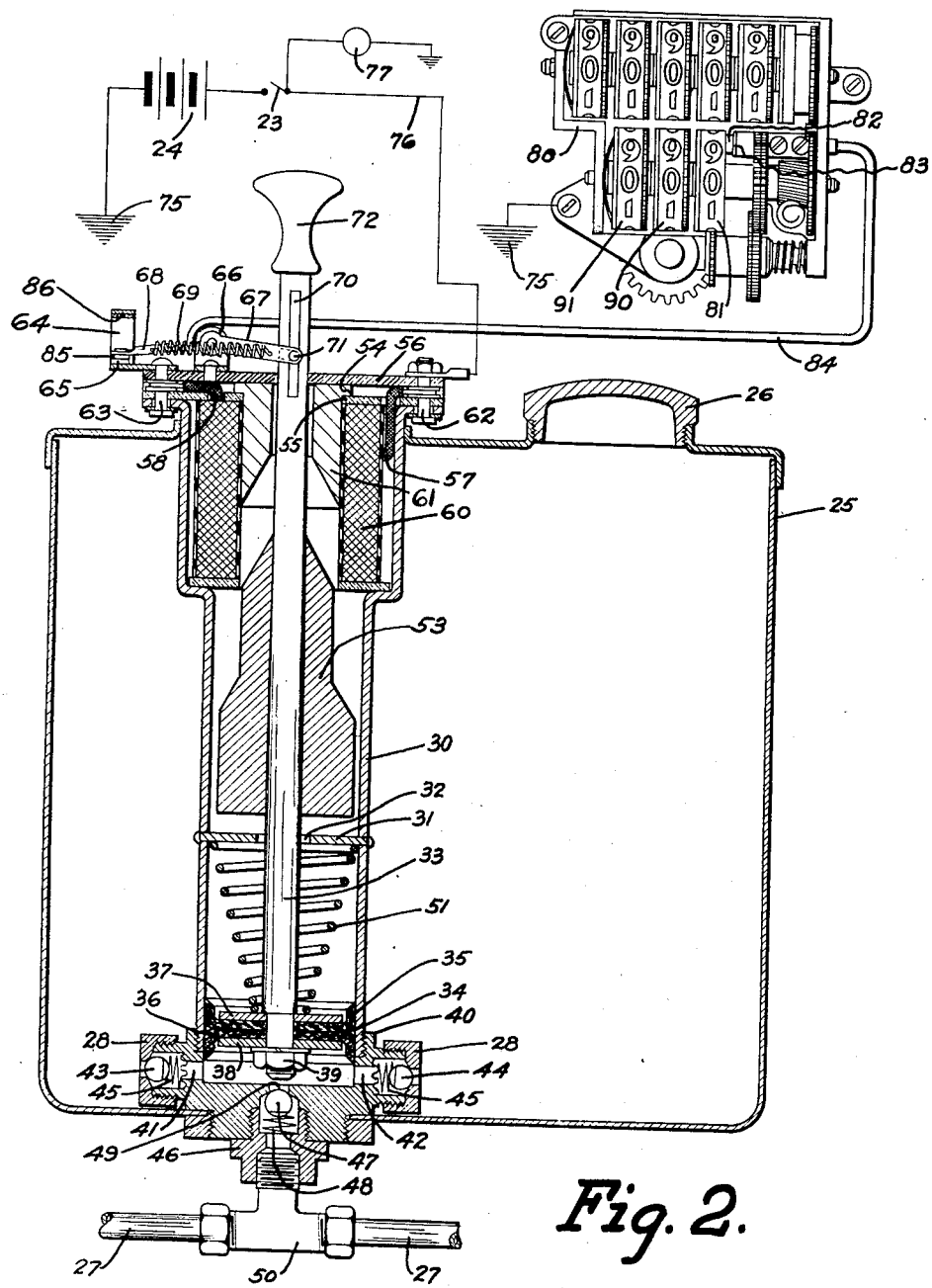
Fig. 2 is a part diagrammatic part structural view showing the lubricant supply reservoir and its associate pump together with the odometer control.

The lubricating system for the chassis of the vehicle comprises a lubricant reservoir 25 detailably shown in Fig. 2. This reservoir is provided with a cap 26 adapted to be removed for the filling of the reservoir with the lubricant.

The lubricating system of the chassis of the vehicle comprises also a pump adapted to withdraw the lubricant from the reservoir and deliver it, under pressure, to the various lubricator couplings 21 through the distributing pipes which are designated by the numeral 27. This pump may be built into the reservoir as shown in Fig. 2. In this preferred structure, the pump comprises a cylinder 30 in which there is a partition 31 intermediate the ends of said cylinder. An opening 32 in said partition permits the piston rod 33 to extend therethrough this piston rod having attached thereto a piston 34 of any suitable design. In the present drawings the piston is shown comprising two cup-washers 35 and 36 supported between clamping disks 37 and 38 which are urged into clamping engagement with said cup washers by a nut 39 screw-threaded upon the threaded portion of the piston rod 33 which extends through said disks and washers. At the end of the cylinder 30, within the lubricant reservoir 25, there is attached a housing member 40 having oppositely disposed passages 41 and 42 which provide valve chambers for the ball check valves 43 and 44 respectively. Each ball check valve is provided with a spring 45 normally yieldingly urging said ball check valve into engagement with a seat provided by a member 28 to close the passage containing the valve from communication with the reservoir 25. A nipple 46, threaded into a passage 49 in the housing member 40, has a recess providing a valve chamber for the ball check valve 47. A spring 48 in said chamber yieldingly urges the ball check valve 47 into engagement with a seat provided in the passage 49 of the housing member 40. A coupling 50, threaded to the nipple 46, has distributing pipes 27 connected thereto. From this it may be seen that the distributing pipes 27 may communicate with the interior of the cylinder 30 through the passage 49 in the housing member 40, these distributing pipes however being normally cut off from such communication with the cylinder by the ball check valve 47.

A spring 51 is interposed between the piston 34 and the partition 31, this spring yieldably urging the piston into normal position as shown in Fig. 2 in which position lubricant within the cylinder portion beneath the piston will have been discharged into the distributing pipes through the passage 49 against the effect of the ball check valve 47.

On the side the partition 31 opposite the piston 34 piston rod 33 has a weight member 53 secured thereto which assists spring 51 in moving the piston into the normal lubricant discharging position.

The upper end of the cylinder 30 or more specifically the end thereof extending from the interior of the lubricant reservoir 25 is of larger diameter than the portion of the cylinder including piston 34. This portion of the cylinder provides a housing for the electro-magnet which comprises a winding 60 insulatingly mounted upon a hollow metallic core 61 in any suitable manner. As shown in Fig. 2, core 61 has an outwardly extending annular flange 54 at its outer end, which rests upon an insulating plate 55 mounted upon an outwardly extending flange provided at the end of the cylinder 30 which extends outside the lubricant reservoir 25. Another insulating plate 56 is supported upon the outer end of the core 61. This construction maintains plates 55 and 56 in spaced relation thereby permitting the lead wires 57 and 58 of the electro-magnet winding to extend between said plates to their respective terminals 62 and 63 which also act to clamp the plates 55 and 56 upon the flange of the cylinder structure. By this means core 61 is also held rigidly in proper position. Terminal 63, in the form of a rivet holds a bracket 64 in proper position upon the insulating plate 56. This bracket supports a contact 65 and provides a stop member 86 to be described. A standard 66 is supported upon the insulating plate 56, this standard pivotally carrying levers 67 and 68 of a toggle switch. A spring 69 has its ends anchored respectively to said levers 67 and 68, this spring quickly throwing said levers from one extreme position to the other in response to the movement of the lever 67 by the piston rod 33. As shown in Fig. 2 the piston rod is provided with an elongated slot 70 into which a pin 71 on the lever 67 extends. The outer end of the piston rod 33 has a handle 72 provided thereon whereby the piston 34 may be operated manually.

The battery 24 has one side thereof connected with a terminal of the ignition switch 23 the other side being connected with the ground 75. Another terminal of the ignition switch 23 is connected with the terminal 62 through wire 76. The circle 77 designates the ignition unit of the vehicle in diagrammatic form.

The speedometer 22, as has been mentioned, provides a odometer which is designated as a whole by the numeral 80. The odometer has a plurality of annular members provided with numerals on their outer peripheral surface, these annular members being operated through suitable gearing to indicate the distances through which the vehicle has been operated. Of the annular members, the annular member designated by the numeral 81 will indicate in tenths of miles the distance through which the vehicle has been operated. On this annular member 81 there is provided a contact 82 which is adapted to engage another contact 83 once in every revolution of said annular member or more specifically once in every ten-tenths of a mile. Contact 83 supported in the odometer in any suitable manner has a wire 84 connected thereto which is also connected to the arm 68 of the toggle switch, said arm carrying contact 85 which is adapted to be moved into engagement with the contact 65.

The operation of the device is as follows:

When the operator desires to operate the vehicle the switch 23 is closed to render the ignition system operative. Closing of the switch 23 also connects the electro-magnetic winding 60 with the storage battery 24 and if the contacts 82 and 83 of the odometer are in engagement the following circuit will be closed; from the storage battery 24 across switch 23, through wire 76 to terminal post 62, then through the electro-magnetic winding 60 to the rivet 63, then through the bracket 64 across contacts 65 and 85, through lever 68 and wire 84 across contacts 83 and 82 and thence through the ground connections 75 back to the battery 24. This closed circuit will cause the electro-magnet to become energized and thus the weight member 53 acting also as an armature will be drawn upwardly toward the core 61 of the electro-magnet against the effect of spring 51, this causing the piston 34 to be moved away from the housing member 40. Suction is now created within the cylinder 30 and the lubricant within the reservoir 25 will flow past valves 43 and 44, through passages 41 and 42 into the space beneath the piston. After the piston rod 33 moves upwardly a predetermined distance, the bottom end of the slot 70 in said rod will engage the pin 71 of the toggle switch, continued movement of the rod 33 operating the switch lever 67. As soon as said lever has been moved sufficiently to bring the end of the spring 69, attached thereto, above the center line of lever 68, the spring, secured to lever 68 will quickly move said lever upwardly against the insulating stop portion 86 of bracket 64, thus contact 85 will be moved out of engagement with contact 65 and consequently the circuit through the electro-magnet will be broken. If, during this interim, contact 82 will have moved out of engagement with its associate contact 83 due to the movement of the annular member 81, in response to the operation of the vehicle through one-tenth of a mile, spring 51 will comparatively slowly return the piston 34 toward the normal, discharge position as shown in Fig. 2. During this movement of the piston by spring 51 the lubricant within the cylinder 30 is forced under pressure through passage 49 past valve 47 into the coupling 50 and thence into the various distributing pipes 27. If, on the other hand, contact 82 has not been moved off of contact 83 before separation of contacts 65 and 85, then, as soon as the upper end of slot 70 engages pin 71 on the downward movement of the piston rod 33 and has moved the lever 67 sufficiently to again snap the switch to closed position, as shown in Fig. 2, the piston will again be moved upwardly. The device is so designed, however, that the movement of the piston by spring 51 is comparatively slow and thus said piston will ordinarily not travel a sufficient distance to actuate switch contact 85 into its circuit closing position before the odometer contact 82 has been moved from its cooperating contact 83.

In the present invention applicant has provided a lubricating system for the chassis of a vehicle which during operation of the vehicle, is entirely under the control of the odometer. This construction provides for a charge of lubrication to be delivered under pressure to the various distributing pipes once for every mile of vehicle operation. If it be desired to operate the pump once every ten miles the contact 82 could be placed upon the annular member 90 which indicates ten miles for a single rotation of said member. If it be desired to operate the pump once every hundred miles the contact 82 could be placed upon the annular member 91. If, on the other hand, it be desired to operate the pump more than one time a second contact 82 could be placed upon the annular member 81. The necessity of closing the ignition switch to render this lubricating device operative provides a protection against operation of this device when the vehicle is not being driven.

Handle 72 permits lubrication of the chassis when the vehicle is not being operated. One pull on said handle provides for one charge of lubricant to be delivered to the various bearings on the chassis.

While the form of embodiment of the present invention as herein disclosed, constitutes a preferred form, it is to be understood that other forms might be adopted, all coming within the scope of the claims which follow.

What is claimed is as follows:

1. A lubricating system for the chassis of a vehicle having an odometer, of a plurality of lubricant distributing pipes; a lubricant reservoir; a plunger pump; an electromagnet adapted to operate the plunger pump through its stroke to withdraw lubricant from the reservoir; a spring adapted to operate the plunger pump through its stroke to force lubricant into the distributing pipes; and two circuit controllers adapted to cooperate to regulate the operation of the electromagnet, one of said controllers being directly operated by the pump, the other by the odometer.

2. A lubricant system for the chassis of a vehicle having an odometer, the combination with a plurality of lubricant distributing pipes; of a lubricant reservoir; a source of electrical energy; a pump adapted to withdraw lubricant from the reservoir on its one stroke and deliver said lubricant to the distributing pipes on its other stroke; an electromagnet for moving the pump only through its lubricant withdrawal stroke; a spring adapted to move the pump only through its lubricant delivery stroke; a circuit controller operated by the pump and adapted to control the circuit connections to the electromagnet of said pump; and a circuit controller operated by the odometer for connecting and disconnecting the circuit controller of the pump with the source of energy at predetermined measured intervals.

3. A lubricant system for the chassis of a vehicle having on odometer, the combination with a plurality of lubricant distributing pipes; of a lubricant reservoir; a source of electrical energy; a pump adapted to withdraw lubricant from the reservoir on its one stroke and deliver said lubricant to the distributing pipes on its other stroke; an electromagnet for moving the pump only through its lubricant withdrawal stroke; a spring adapted to move the pump only through its lubricant delivery stroke; a circuit controller operated by the pump and adapted to be closed when the pump reaches the end of its fluid delivery stroke and then remains closed while the pump is moving through its lubricant withdrawing stroke and to be opened when the pump reaches a predetermined point adjacent the end of said stroke, thus remaining open while the pump is moving through its lubricant delivery stroke; a circuit controller on the odometer and adapted to be operated thereby to connect and disconnect the pump operated controller with the source of electrical energy at predetermined measured intervals.

WILLIAM A. CHRYST.